UNITED STATES PATENT OFFICE.

THOMAS HEAP, OF ST. JOSEPH, MISSOURI.

IMPROVEMENT IN CONCRETES FOR PAVING AND ROOFING TILES.

Specification forming part of Letters Patent No. 153,253, dated July 21, 1874; application filed April 17, 1874.

*To all whom it may concern:*

Be it known that I, THOMAS HEAP, of the city of St. Joseph, in the county of Buchanan and State of Missouri, have invented a new and improved mode of manufacturing a certain species of building material of concrete to be used in the construction of pavements and roofs; and I do hereby declare the following to be a full and exact description thereof.

Said concrete is composed of the following materials, compounded in the manner hereinafter stated:

For the purpose of manufacturing a square foot by three inches in depth of the concrete aforesaid, I take one (1) pound (avoirdupois) of asphaltum; one (1) pound (avoirdupois) of litharge; three (3) ounces (avoirdupois) of gum-shellac; five (5) ounces (avoirdupois) of sulphate lime; one (1) ounce (avoirdupois) of gum-copal; five (5) ounces (avoirdupois) of hydraulic cement; three (3) ounces (avoirdupois) of india-rubber, and boil and thoroughly mix them up together. I then add to the boiling-mixture half a pound of plaster-of-paris, and also sand, or, in lieu thereof, gravel. All these component parts, being thoroughly mixed and boiled to the consistency of common mortar, form the concrete, which is then capable of being molded into any form desired, and when cooled and exposed to the air becomes hard and solid.

The addition of whatever coloring-matter desired to the mixture last mentioned can be used to impart that color to the concrete.

What I claim as my invention is—

A concrete for pavements and roofs formed of asphaltum, litharge, gum-shellac, sulphate lime, gum-copal, hydraulic cement, and rubber, compounded in about the proportions herein specified.

THOMAS HEAP.

Witnesses:
    JAS. H. RINGO,
    MURAT MASTERSON.